United States Patent [19]

Burkhardt et al.

[11] Patent Number: 4,527,056
[45] Date of Patent: Jul. 2, 1985

[54] ERROR CORRECTION SYSTEM FOR POSITION MEASURING DEVICE

[75] Inventors: Horst Burkhardt, Truchtlaching; Günther Nelle, Bergen, both of Fed. Rep. of Germany

[73] Assignee: Dr. Johannes Heidenhain GmbH, Traunreut, Fed. Rep. of Germany

[21] Appl. No.: 489,250

[22] Filed: Apr. 27, 1983

[30] Foreign Application Priority Data

May 4, 1982 [DE] Fed. Rep. of Germany ....... 3216616

[51] Int. Cl.$^3$ .......................... G01B 5/04; G01B 11/04
[52] U.S. Cl. .............................. 250/237 G; 33/125 A; 33/125 C; 356/374
[58] Field of Search ................. 250/237 G; 33/125 R, 33/125 A, 125 C, 125 T; 356/373, 374, 375, 383, 395

[56] References Cited

U.S. PATENT DOCUMENTS

| | | | |
|---|---|---|---|
| 3,709,611 | 1/1973 | Taisne | 250/237 G |
| 4,060,903 | 12/1977 | Ernst | 33/125 R |
| 4,170,828 | 10/1979 | Ernst | 33/125 R |
| 4,170,829 | 10/1979 | Nelle | 33/125 R |
| 4,262,423 | 4/1981 | Affa | 33/125 A |
| 4,430,799 | 2/1984 | Affa | 33/125 R |
| 4,461,083 | 7/1984 | Ernst | 250/237 G |
| 4,475,289 | 10/1984 | Nelle | 250/237 G |
| 4,490,914 | 1/1985 | Spies | 33/125 C |

FOREIGN PATENT DOCUMENTS

| | | |
|---|---|---|
| 69936 | 10/1968 | Fed. Rep. of Germany . |
| 2518745 | 8/1977 | Fed. Rep. of Germany . |
| 7814349 | 5/1978 | Fed. Rep. of Germany . |
| 2735154 | 10/1978 | Fed. Rep. of Germany . |
| 2724858 | 11/1979 | Fed. Rep. of Germany . |
| 2820753 | 3/1980 | Fed. Rep. of Germany . |

OTHER PUBLICATIONS

Handbook of Transducers for Electronic Measuring Systems, by Harry N. Norton, California Institute of Technology, 1969 by Prentice Hall, pp. 192-197.

*Primary Examiner*—Edward P. Westin
*Attorney, Agent, or Firm*—Willian Brinks Olds Hofer Gilson & Lione Ltd.

[57] ABSTRACT

A length or angle measuring system is provided in which for the purposes of error correction the graduation of the measuring scale is scanned on both sides of the graduation axis which runs along the measuring direction. The weighting given to the two sides of the measuring graduation is varied according to the desired error correction course. Several different approaches to varying this weighting are disclosed, including the mounting of a scanning unit so as to be shiftable transversely to the graduation axis of the graduation.

24 Claims, 15 Drawing Figures

ERROR CORRECTION SYSTEM FOR POSITION MEASURING DEVICE

BACKGROUND OF THE INVENTION

This invention relates to a length or angle measuring system of the type comprising a measuring graduation which defines a graduation axis extending along the graduation and a scanning unit positioned to scan the graduation, in which means are provided for coupling the graduation and the scanning unit to two relatively movable objects. In particular, this invention relates to an improved error correction system for such a measuring system.

A variety of error correction systems for such position measuring systems are known to the art.

For example, in U.S. Pat. No. 4,170,829 there is described a correction system for a length or angle measuring device in which a measuring graduation of the measuring device is slightly deflected at selected positions in a direction substantially perpendicular to the plane of the graduation by pressure or tension forces applied in correspondence to the desired error correction course. An array of adjusting members is mounted in the carrier body for deflecting the measuring graduation as desired. The accuracy of this nonlinear error correction system depends in part upon the number and spacing of the adjusting members per unit of measuring length.

U.S. Pat. No. 4,060,903 discloses a length measuring system in which a linear error correction is provided by means of longitudinal stretching or compression of the scale. Stretching and compression devices are provided at both ends of the measuring instrument to bring about the desired change in dimension of the scale. This correction system does not permit nonlinear error correction.

U.S. Pat. No. 4,170,828 describes a length measuring system which incorporates an error correction system which comprises a link chain. Individual members of this chain are adjustable in accordance with the desired error correction course transversely to the measuring direction. A transfer element is positioned to scan this link chain and to bring about a correcting relative movement along the measuring direction between a scanning unit (which is guided in parallel motion with respect to the graduation plane of the scale) and the scale. In this error correction system, the accuracy of the error correction is dependent upon the number of chain link members provided per unit of measuring length.

U.S. Pat. No. 4,262,423 discloses an error correction system for a length measuring instrument, in which an error correction profile is formed as an integral component of a carrier or housing for the scale. This error correction profile is scanned by the transfer element which brings about a correcting relative movement along the measuring direction between the scanning unit and the scale. The scanning unit is guided in parallel motion with respect to the graduation plane of the scale.

In the two last-mentioned correction systems, the transfer elements take the form of pivotable angle elements which are subject to mechanical wear. Such pivotable angle elements can bring about a substantial increase in the cross-sectional dimensions of the position measuring system. Such an increase in the size of the position measuring system can be detrimental to a flexible use of the measuring system in certain applications.

SUMMARY OF THE INVENTION

The present invention is directed to an improved error correction system for a position measuring device, in which deformations of the measuring scale are not required, in which the number of required mechanical elements can be reduced, and which can directly be installed in commercially standard position measuring systems without substantial structural changes to these systems.

According to this invention, a length or angle measuring system of the type described above is provided with means, included in the scanning unit, for scanning a first portion of the graduation on a first side of the graduation axis and a second portion of the graduation on a second side of the graduation axis. In addition, means are provided for varying the weighting given to the first and second portions of the graduation in accordance with the desired error correction course.

This invention provides the important advantage that it can be implemented without expensive mechanical elements, and can be used to construct a simple and economical error correction system for a position measuring device. Measuring systems incorporating the present invention can be made reliable and flexible in use because of the substantial reduction of mechanical parts which are subject to wear and because of the very small spatial size of the correction system. Furthermore, the present invention can be used to correct both linear and nonlinear errors, substantially regardless of the measuring lengths. Further advantageous features of this invention are set forth in the attached dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 1b is an elevational view in partial section taken along line 1b—1b of FIG. 1a.

DETAILED DESCRIPTION OF THE PRESENTLY PREFERRED EMBODIMENTS

Figure 1A:
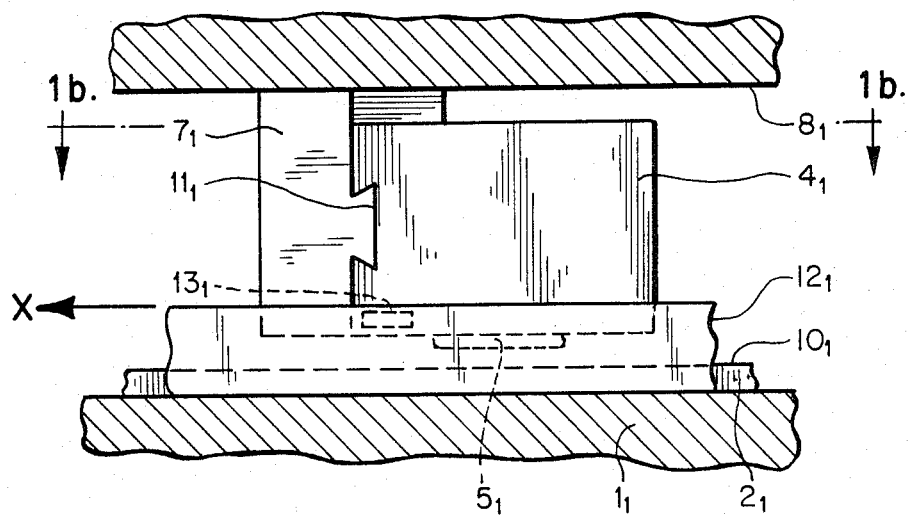
FIG. 1a is a fragmentary top view of a length measuring instrument which incorporates a first preferred embodiment of this invention.
Figure 1B:
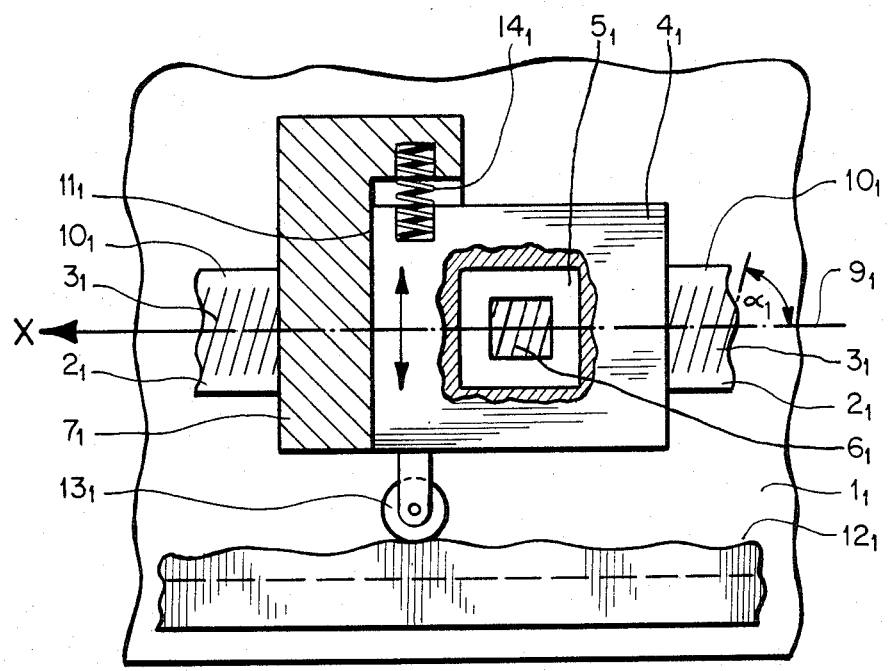

Turning now to the drawings, FIGS. 1a and 1b provide two views of a length measuring instrument which incorporates a first preferred embodiment of this invention. This measuring instrument includes a measuring scale $2_1$ which is fastened on a bed $1_1$ of a machine (not shown), for example by a suitable adhesive.

The scale $2_1$ defines a measuring graduation $3_1$ which is scanned by a scanning unit $4_1$. The scanning unit $4_1$ includes a scanning plate $5_1$ which defines a scanning graduation $6_1$. The scanning unit $4_1$ also includes an illuminating arrangement and a plurality of photosensors (not shown). The scanning unit $4_1$ is rigidly connected with a follower $7_1$ which is fastened rigidly to a slide piece $8_1$ of the machine.

In order to correct for measuring errors (such as division or graduation errors in the measuring graduation $3_1$ or machine errors) in the measurement of the relative position between the slide piece $8_1$ and the bed $1_1$ of the machine, the graduation $3_1$ of the scale $2_1$ is made up of an array of grid lines, each oriented at an angle $\alpha_1$, as are the grid lines of the scanning graduation $6_1$. In this preferred embodiment, $\alpha_1$ as measured with respect to the graduation axis $9_1$ which runs in the measuring direction X is less than 90 degrees. The scanning unit $4_1$ together with the scanning plate $5_1$ are mounted to slide perpendicularly to the graduation axis $9_1$ in a plane parallel to the graduation plane $10_1$ of the scale $2_1$ in a dovetail guide $11_1$. An error correction profile $12_1$ is mounted to the bed $1_1$ alongside the scale $2_1$ and is scanned by a roller $13_1$ which is mounted to the scanning unit $4_1$. A spring $14_1$ is positioned between the follower $7_1$ and the scanning unit $4_1$ in order to bias the roller $13_1$ against the error correction profile $12_1$.

The error correction system of FIGS. 1a and 1b operates during the measuring process to maintain the scanning graduation $6_1$ defined by the scanning plate $5_1$ parallel to the measuring graduation $3_1$ of the scale $2_1$. However, the scanning graduation $6_1$ is moved in a corrective relative movement along the measuring direction X with respect to the measuring graduation $3_1$ as a result of the displacement of the scanning unit $4_1$ perpendicularly to the graduation axis $9_1$. Of course, the position of the scanning unit $4_1$ transversely to the graduation axis $9_1$ is determined by the contour of the error profile $12_1$. Thus, a measuring value correction according to the desired error correction course in the measuring direction X is provided through differential weighting of the scanning of the measuring graduation $3_1$ on the two sides of the graduation axis $9_1$.

Figure 2:
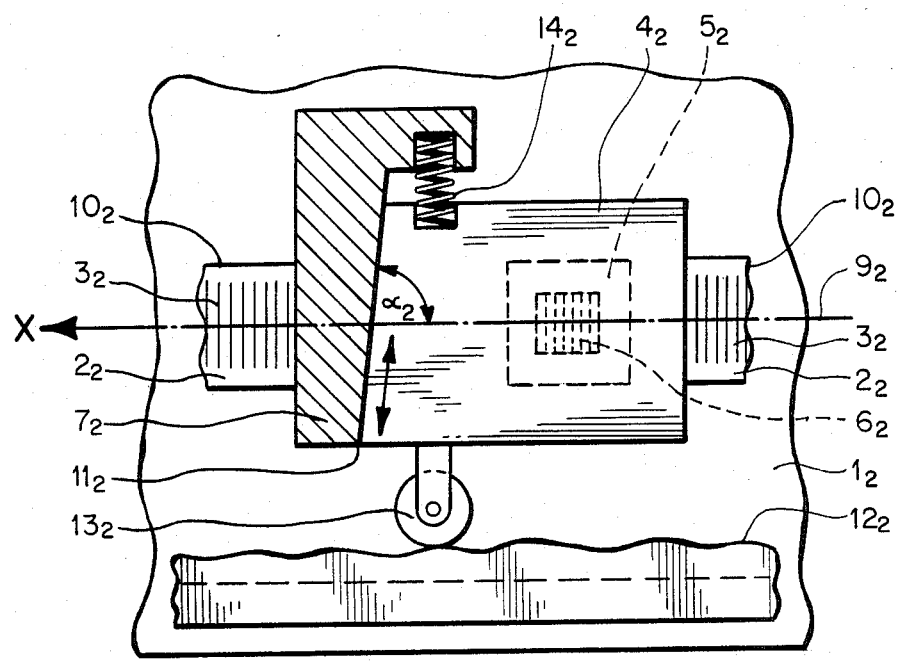
FIG. 2 is an elevational view corresponding to that of FIG. 1b of a length measuring instrument which incorporates a second preferred embodiment of this invention.

FIG. 2 is a view corresponding to FIG. 1b of a length measuring instrument which incorporates a second preferred embodiment of this invention. This instrument comprises a measuring scale $2_2$ which is secured to a bed $1_2$ of a machine (not shown), as for example by a suitable adhesive. The scale $2_2$ defines a measuring graduation $3_2$ which is scanned by a scanning unit $4_2$. For this purpose, the scanning unit $4_2$ includes a scanning plate $5_2$ which defines a scanning graduation $6_2$. The scanning unit $4_2$ is slidably connected to a follower $7_2$ which is in turn rigidly fastened to a slide piece (not shown) of the machine.

This length measuring instrument includes an error correction system. The scanning graduation $6_2$ of the scanning plate $5_2$ and the measuring graduation $3_2$ of the scale $2_2$ both run perpendicularly to the graduation axis $9_2$ of the measuring graduation $3_2$. The scanning plate $5_2$ is mounted to move with the scanning unit $4_2$, and the scanning unit $4_2$ is mounted in a linear guide $11_2$ of the follower $7_2$ to slide at an angle $\alpha_2$, which is less than 90 degrees with respect to the graduation axis $9_2$. The movement of the scanning unit $4_2$ is in a plane parallel to the graduation plane $10_2$ of the scale $2_2$. An error correction profile $12_2$ is fastened alongside of the scale $2_2$ on the bed $1_2$ and is scanned by a roller $13_2$ which is mounted to the scanning unit $4_2$. A compression spring $14_2$ mounted between the follower $7_2$ and the scanning unit $4_2$ biases the roller $13_2$ against the error correction profile $12_2$.

The error correction system described above acts to provide a correcting relative movement in the measuring direction X of the scanning graduation $6_2$ of the scanning plate $5_2$ with respect to the measuring graduation $3_2$ of the scale $2_2$. This correcting relative movement is brought about in consequence of the displacement of the scanning unit $4_2$ at an angle $\alpha_2$ to the graduation axis $9_2$. In this manner, a measuring value correction according to the desired error correction course in the measuring direction X is achieved by varying the weighting with which the measuring graduation $3_2$ of the scale $2_2$ on both sides of the graduation axis $9_2$ is scanned.

Figure 3:
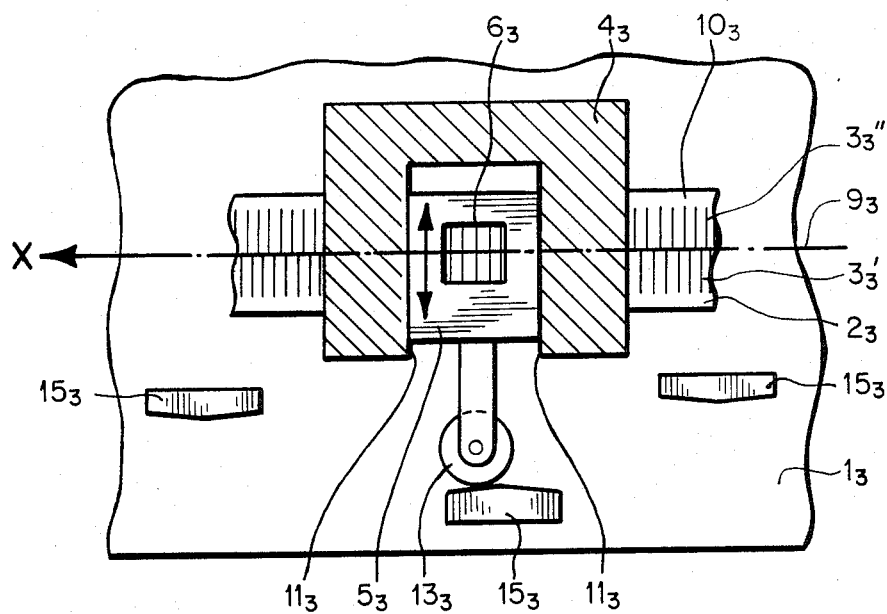
FIG. 3 is an elevational view corresponding to FIG. 1b of a length measuring instrument which incorporates a third preferred embodiment of this invention.

FIG. 3 shows a view corresponding to that of FIG. 1b of a length measuring instrument which incorporates a third preferred embodiment of this invention. This instrument includes a scale $2_3$ which is fasten to a bed $1_3$ of a machine (not shown), as for example by a suitable adhesive. This scale $2_3$ defines a measuring graduation $3_3$ which is scanned by a scanning unit $4_3$ by means of a scanning plate $5_3$ which defines a scanning graduation $6_3$. In this embodiment, the scanning unit $4_3$ is rigidly secured to a slide piece (not shown) of the machine.

In order to bring about the desired error correction, the graduation $6_3$ of the scanning plate $5_3$ and the graduation $3_3$ of the scale $2_3$ are oriented such that both run perpendicularly with respect to the graduation axis $9_3$ of the graduation $3_3$. In this embodiment, the graduation $3_3$ is made up of two separate graduations $3_3'$, $3_3''$ which are oriented alongside one another and are offset with respect to one another by a certain amount in the measuring direction X. This offset is unequal to $(N/2)C$, where N is an integer and C is the grid constant of the graduations $3_3'$, $3_3''$. In this preferred embodiment, the offset between the two graduations $3_3'$, $3_3''$ is equal to $(\frac{1}{4})C$. The scanning plate $5_3$ is mounted to slide in a clamp guide $11_3$ which is mounted to the scanning unit $4_3$ such that the scanning plate $5_3$ is guided for motion perpendicular to the graduation axis $9_3$ in a plane parallel to the graduation plane $10_3$ of the scale $2_3$. A plurality of setting members $15_3$ are arranged alongside the scale $2_3$ on the bed $1_3$ and are scanned by a roller $13_3$ which is mounted to the scanning plate $5_3$.

During the measuring process, as the scanning unit $4_3$ moves along the scale $2_3$, the roller $13_3$ comes into contact with respective peaked surfaces of the setting members $15_3$. In accordance with the position of the setting members $15_3$ transversely to the graduation axis $9_3$, the scanning plate $5_3$ is positioned perpendicularly to the graduation axis $9_3$. In this way, the scanning graduation $6_3$ is moved as desired so as to scan the two graduations $3_3'$, $3_3''$ on both sides of the graduation axis $9_3$ with different weighting. In this way, a measuring value correction in accordance with the desired error correction course in the measuring direction X is obtained.

Figure 4:
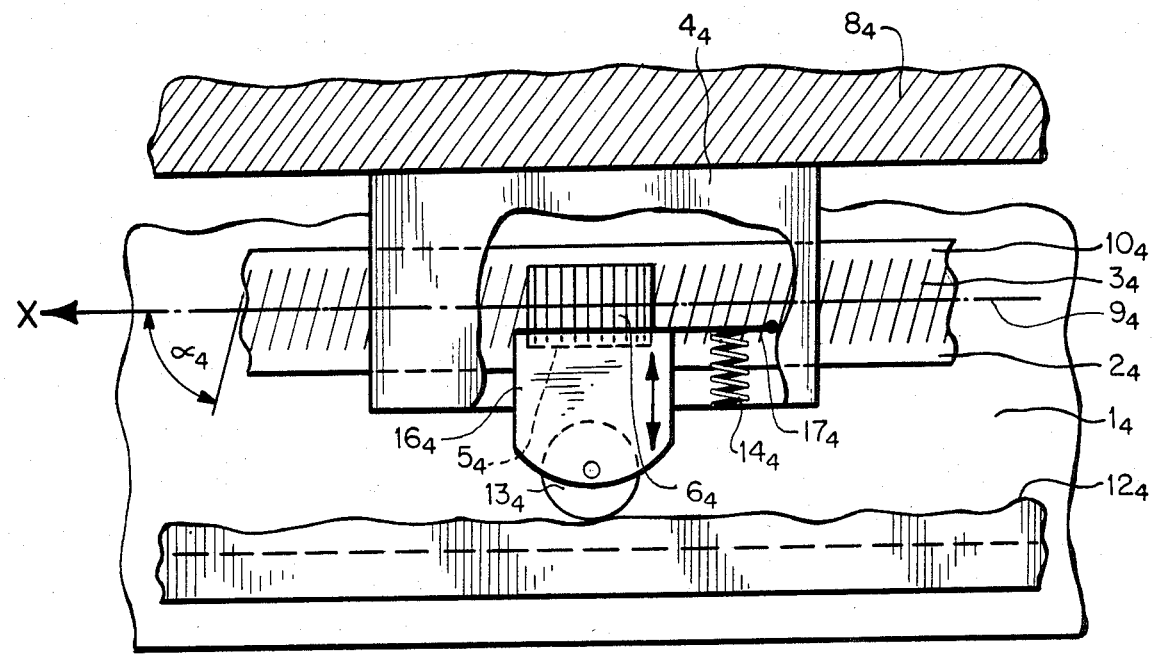
FIG. 4 is an elevational view corresponding to FIG. 1b of a length measuring instrument which incorporates a fourth preferred embodiment of this invention.

FIG. 4 is a view corresponding to that of FIG. 1b of a length measuring instrument which incorporates a fourth preferred embodiment of this invention. In this instrument, a scale $2_4$ is fastened to a bed $1_4$ of a machine (not shown) in any suitable manner. The scale $2_4$ defines a measuring graduation $3_4$ which is scanned by a scanning unit $4_4$ by means of a scanning plate $5_4$ which defines a scanning graduation $6_4$. The scanning unit $4_4$ is rigidly fastened to a slide piece $8_4$ of the machine. In this embodiment, the graduation of the scanning plate $5_4$ is oriented perpendicularly to the graduation axis $9_4$ of the measuring graduation $3_4$, and the graduation $3_4$ of the scale $2_4$ is oriented on an angle $\alpha_4$ which is less than 90 degrees with respect to the graduation axis $9_4$. A diaphragm $16_4$ is pivotably mounted to the scanning unit $4_4$ by means of a lever $17_4$ in order partially to cover the graduation $3_4$ of the scale $2_4$ and the graduation $6_4$ of the scanning plate $5_4$. An error correction profile $12_4$ is fastened to the bed $1_4$ alongside the scale $2_4$, and this profile $12_4$ is scanned by a roller $13_4$ which is mounted to the diaphragm $16_4$. A tension spring $14_4$ is provided between the lever $17_4$ and the scanning unit $4_4$ to bias the roller $13_4$ against the profile $12_4$. Thus, the error correction profile $12_4$ and the roller $13_4$ cooperate to position the diaphragm $16_4$ transversely with respect to the graduation axis $9_4$ in a accordance with the contour of the error correction profile $12_4$.

During the measuring process, the diaphragm $16_4$ operates to mask and partially cover a variable portion of the graduation $3_4$ and the graduation $6_4$ on one side of the graduation axis $9_4$ in correspondence with the contour of the profile $12_4$. For this reason, the graduation $3_4$ of the scale $2_4$ is scanned on both sides of the graduation axis $9_4$ with different weighting, and in this way a measuring value correction in accordance with the desired error correction course in the measuring direction X is obtained.

Figure 5:
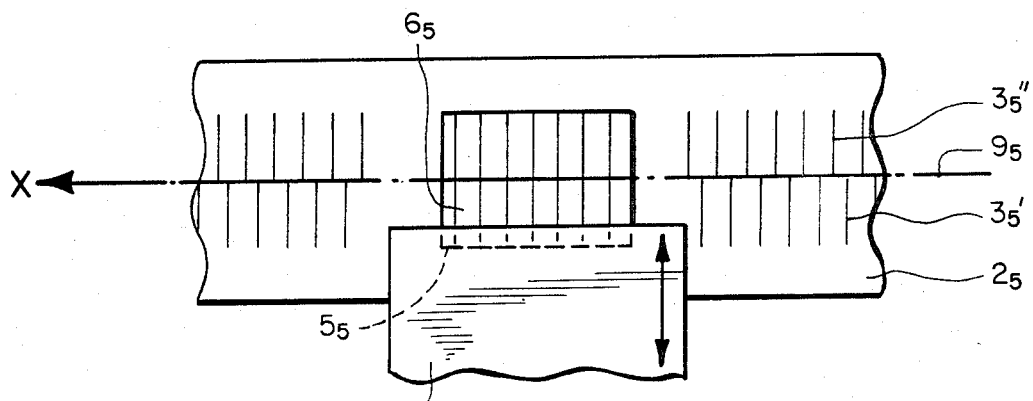
FIG. 5 is a schematic representation of portions of a length measuring instrument which incorporates a fifth preferred embodiment of this invention.

FIG. 5 is a fragmentary view of a fifth preferred embodiment of this invention which operates similarly to that of FIG. 4. However, in the embodiment of FIG. 5 a scale $2_5$ which defines a graduation $3_5$ is scanned by a scanning plate $5_5$ which defines a scanning graduation $6_5$. In this embodiment, the graduation $6_5$ and the graduation $3_5$ are oriented perpendicularly to the graduation axis $9_5$ of the graduation $3_5$. Here, the graduation $3_5$ is made up of two separate graduations $3_5'$, $3_5''$, each positioned on a respective side of the graduation axis $9_5$ and each offset with respect to the other by a selected amount in the measuring direction X. A diaphragm $16_5$ is provided and positioned to mask and cover to a variable extent portions of the graduation $3_5'$ of the scale $2_5$ and the aligned portions of the graduation $6_5$ of the scanning plate $5_5$. During the measuring process, in consequence of the partial coverage of the graduation $3_5'$ and aligned portions of the graduation $6_5$ on one side of the graduation axis $9_5$, the graduation $3_5$ of the scale $2_5$ is scanned on both sides of the graduation axis $9_5$ with different weighting, in dependence upon the position of the diaphragm $16_5$. In this way, the measuring value corrected by the desired amount in the measuring direction X is provided.

Figure 6:
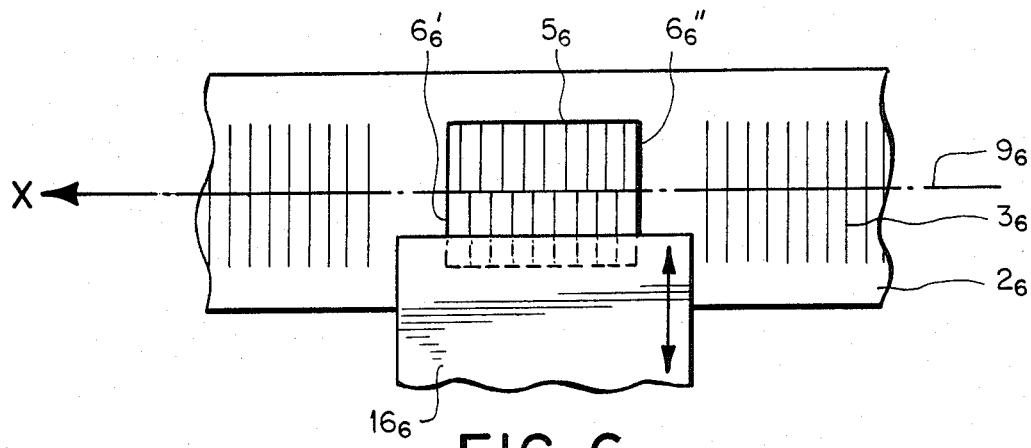
FIG. 6 is a schematic representation of portions of a length measuring instrument which incorporates a sixth preferred embodiment of this invention.

FIG. 6 is a schematic representation of yet another alternate form of the embodiment of FIG. 4. As shown in FIG. 6, this embodiment includes a scale $2_6$ which defines a measuring graduation $3_6$, which is scanned by a scanning plate $5_6$ which defines a scanning graduation $6_6$. In this embodiment, the graduation $3_6$ and the graduation $6_6$ are both oriented perpendicularly to the graduation axis $9_6$ of the graduation $3_6$. As part of the error correction system of this embodiment, the graduation $6_6$ is made up of two separate graduations $6_6'$, $6_6''$, each of which is oriented on a respective side of the graduation axis $9_6$ and both of which are offset with respect to one another by a selected amount in the measuring direction X. In this preferred embodiment, the offset between the two graduations $6_6'$, $6_6''$ is preferably equal to $(\frac{1}{4})C$, where C is the grid constant of the two graduations $6_6'$, $6_6''$. A diaphragm $16_6$ is provided to variably and partially cover portions of the graduation $3_6$ of the scale $2_6$ and of the graduation $6_6'$ of the scanning plate $5_6$. During the measuring process, in consequence of the partial covering and masking of the graduation $3_6$ and of the graduation $6_6'$ on one side of the graduation axis $9_6$, the graduation $3_6$ of the scale $2_6$ is scanned on both sides of the graduation axis $9_6$ with different weighting. In this way, a measuring value corrected according to the desired error correction course along the measuring direction X is obtained.

In alternate embodiments, a diaphragm on both sides of the graduation axis of the measuring graduation can be provided in order partially to cover the graduations of the scale and of the scanning plate to bring about the desired error correction.

If it is desired to make the error correction adjustable, the setting members 15 and the error correction profiles 12 can be made adjustable in position.

Figure 7:
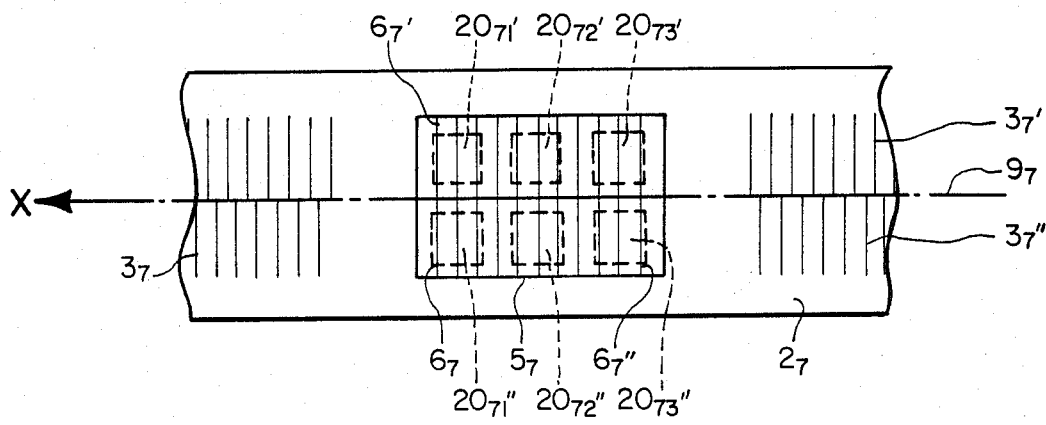
FIG. 7 is a schematic representation of a measuring graduation and scanning elements of a length measuring instrument which incorporates a seventh preferred embodiment of this invention.

FIG. 7 shows portions of a length measuring instrument which incorporates a seventh preferred embodiment of this invention. This instrument includes a scale $2_7$ which defines a graduation $3_7$ which is scanned by a scanning plate $5_7$ which defines a graduation $6_7$. In this embodiment, the graduation $3_7$ and the graduation $6_7$ are both oriented perpendicularly to the graduation axis $9_7$ of the graduation $3_7$. The graduation $3_7$ is made up of two separate graduations $3_7'$, $3_7''$ which are positioned on respective sides of the graduation axis $9_7$ and which are offset with respect to one another by a selected amount in the measuring direction X. The graduation $6_7$ is made up of two graduation $6_7'$, $6_7''$ which are not provided with any reciprocal displacement with respect to one another on the two sides of the graduation axis $9_7$. Three photosensors $20_{71}'$, $20_{72}'$, $20_{73}'$ are aligned with the graduation $6_7'$, and three photosensors $20_{71}''$, $20_{72}''$, $20_{73}''$ are aligned with the graduation $6_7''$. Each set of three photosensors are arranged in line along the measuring direction X. Furthermore, the photosensors $20_{71}'$, $20_{72}'$, $20_{73}'$, are not offset with respect to respective ones of the photosensors $20_{71}''$, $20_{72}''$, $20_{73}''$.

This embodiment includes an evaluating arrangement (not shown in FIG. 7) which is responsive to the output signals of the photosensors $20_{71}'$, $20_{72}'$, $20_{73}'$ to form a first sum signal. This evaluating arrangement is also responsive to the output signals of the photosensors $20_{71}''$, $20_{72}''$, $20_{73}''$ to form a second sum signal. In each case, the evaluating arrangement includes means for drawing on one or more of the output signals of the respective photosensors in order to form the sum signal. Depending on the number of photosensors selected, the amplitude of the first sum signal can vary widely with respect to the amplitude of the second sum signal. In this way, the graduations $3_7'$, $3_7''$ on both sides of the graduation axis $9_7$ are scanned with different weighting. By causing this electronic weighting to vary depending upon the measuring position X, a measuring value correction according to the desired error course in the measuring direction X can thereby be obtained.

Figure 8:
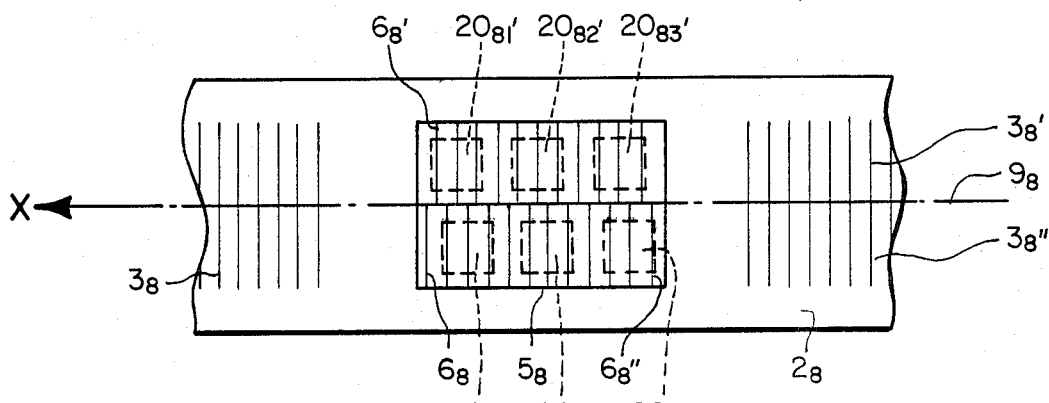
FIG. 8 is a schematic representation of a portion of a scale and scanning elements of a length measuring instrument which incorporates an eighth preferred embodiment of this invention.

FIG. 8 shows portions of a length measuring system which incorporates an eighth preferred embodiment of this invention. This system includes a measuring scale $2_8$ which defines a measuring graduation $3_8$, which is scanned by a scanning plate $5_8$ which defines a scanning graduation $6_8$. In the example shown, the graduation $3_8$ and the graduation $6_8$ both run perpendicularly to the graduation axis $9_8$ of the graduation $3_8$. In this embodiment, the graduation $6_8$ is made up of two separate graduations $6_8'$, $6_8''$, which are disposed on respective sides of the graduation axis $9_8$ and which are offset with respect to one another by a selected amount in the measuring direction X. The graduation $3_8$ is made up of two graduation $3_8'$, $3_8''$ which are not reciprocally offset with respect to one another on the two sides of the graduation axis $9_8$. Three photosensors $20_{81}'$, $20_{82}'$, $20_{83}'$ are aligned with graduation $6_8'$ and three additional photosensors $20_{81}''$, $20_{82}''$, $20_{83}''$ are aligned with graduation $6_8''$. In each set of three photosensors, the individual photosensors are arranged one behind the other along the measuring direction X. The photosensors $20_{81}'$, $20_{82}'$, $20_{83}'$ are offset with respect to respective ones of the photosensors $20_{81}''$, $20_{82}''$, $20_{83}''$ in the measuring direction in the same manner as are graduations $6_8'$, $6_8''$. Thus, the relative positions between the photosensors $20_{81}'$, $20_{82}'$, $20_{83}'$ and the graduation $6_8'$ corresponds to the relative positions between the photosensors $20_{81}''$, $20_{82}''$, $20_{83}''$ and the graduation $6_8''$.

This embodiment includes an evaluating unit (not shown in FIG. 8) which is responsive to the output signals of the photosensors $20_{81}'$, $20_{82}'$, $20_{83}'$ to form a first sum signal and the output signals of the photosensors $20_{81}''$, $20_{82}''$, $20_{83}''$ to form a second sum signal. According to which of the output signals of the photosensors $20_8'$ and the photosensors $20_8''$ are drawn upon for the sum formation for the first and second sum signals, the graduations $3_8'$, $3_8''$ are scanned on both sides of the graduation axis $9_8$ with different weighting. In this way, a measuring value correction according to the error course in the measuring direction X is obtained.

Figure 9:
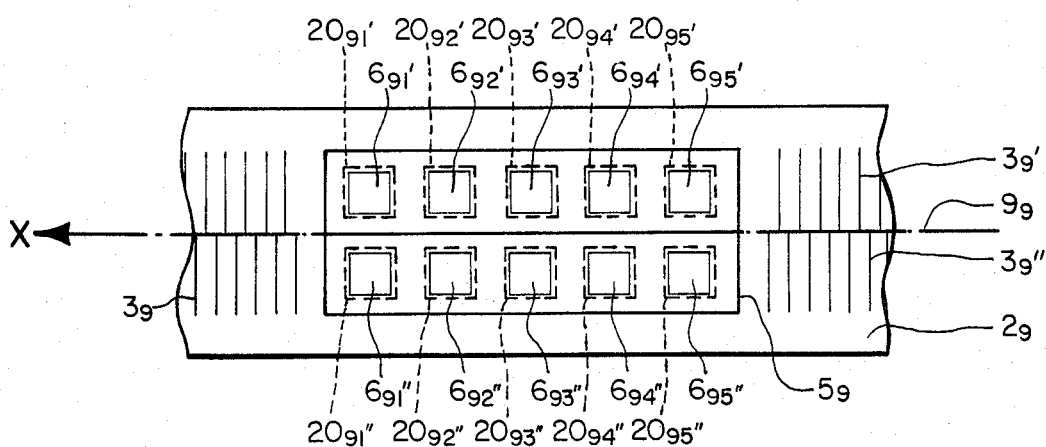
FIG. 9 is a schematic representation of portions of a scale and scanning elements of a length measuring instrument which incorporates a ninth preferred embodiment of this invention.

FIG. 9 shows a scale $2_9$ with a graduation $3_9$ of a length measuring instrument which incorporates a ninth preferred embodiment of this invention. This graduation $3_9$ is scanned by a scanning plate $5_9$ which defines a graduation $6_9$. In this embodiment, the graduation $3_9$ and the graduation $6_9$ are oriented perpendicularly to the graduation axis $9_9$ of the graduation $3_9$. Graduation $3_9$ is made up of two separate graduations $3_9'$, $3_9''$, each of which is positioned on a respective side of the graduation axis $9_9$, and both of which are offset with respect to one another by a certain amount in the measuring direction X. The graduation $6_9$ is made up of two series of graduations, each of which includes five graduation fields $6_{91}'-6_{95}'$, $6_{91}''-6_{95}''$. Within each series of graduation fields, individual graduation fields are arranged in succession along the measuring direction X, and the graduation fields on reciprocal sides of the graduation axis $9_9$ are not offset with respect to one another. A plurality of photosensors $20_{91}'-20_{95}'$, $20_{91}''-20_{95}''$ are provided, each of which is allocated and aligned with a respective one of the graduation fields $6_{91}'-6_{95}'$, $6_{91}''-6_{95}''$, respectively. This embodiment includes an evaluating unit (not shown in FIG. 9) which forms a first sum signal from the output signals of the photosensors $20_{91}'-20_{95}'$ and a second sum signal from the output signals of the photosensors $20_{91}''-20_{95}''$. Depending upon which of the output signals of the photosensors $20_9'$ or of the photosensors $20_9''$ are drawn upon for the sum formation of the first and the second sum signals, the graduations $3_9'$, $3_9''$ are scanned on both sides of the graduation axis $9_9$ with different weighting. As before, this evaluating unit is provided with means for varying the ones of the photosensors $20_9'$, $20_9''$ which are drawn upon for the formation of the respective sum signals in accordance with the stored error correction course. In this way, a measuring value correction which varies in accordance with the desired error correction course in the measuring direction X is obtained.

Figure 10:
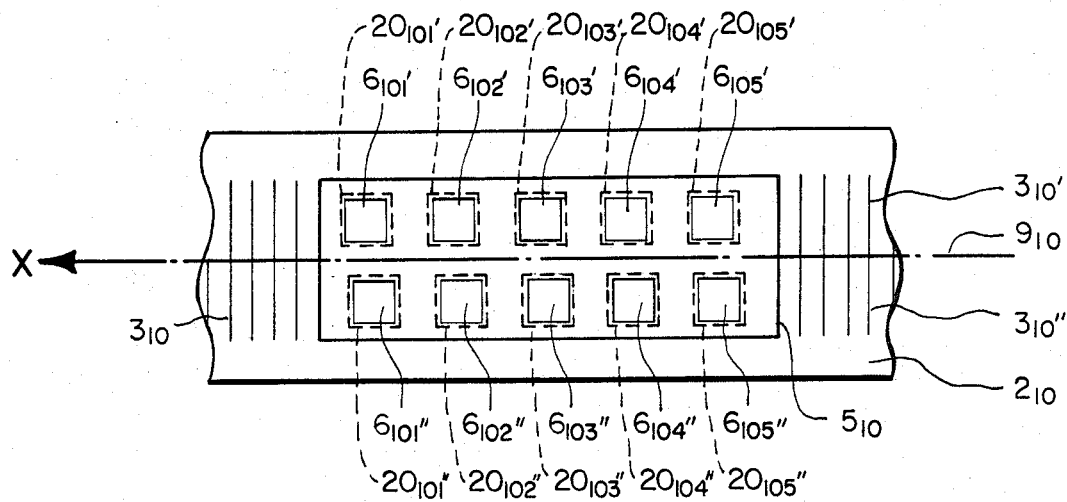
FIG. 10 is a schematic representation of portions of a scale and scanning elements of a length measuring instrument which incorporates a tenth preferred embodiment of this invention.

FIG. 10 shows a scale $2_{10}$ of a length measuring instrument which incorporates a tenth preferred embodiment of this invention. The scale $2_{10}$ defines a graduation $3_{10}$ which is scanned by a scanning plate $5_{10}$ which defines a graduation $6_{10}$. In this embodiment, the graduation $3_{10}$ and the graduation $6_{10}$ both are oriented perpendicularly to the graduation axis $9_{10}$ of the graduation $3_{10}$. Here, the graduation $6_{10}$ is made up of two series of graduation fields $6_{101}'-6_{105}'$, $6_{101}''-6_{105}''$, which fields are arranged in succession in the measuring direction X. The graduation fields $6_{101}'-6_{105}'$ are offset with respect to respective ones of the graduation fields $6_{101}''-6_{105}''$ by a selected amount in the X direction. The graduation $3_{10}$ is made up of two graduations $3_{10}'$, $3_{10}''$ which are aligned with one another and are not offset with respect to one another on the two sides of the graduation axis $9_{10}$. Photosensors $20_{101}'-20_{105}'$, $20_{101}''-20_{105}''$ are allocated and aligned with respective ones of the graduation fields $6_{101}'-6_{105}'$, $6_{101}''-6_{105}''$.

This embodiment includes an evaluating arrangement (not shown in FIG. 10) which forms a first sum signal from the output signals of the photosensors $20_{101}'-20_{105}'$ and which forms a second sum signal from the output signals of the photosensors $20_{101}''-20_{105}''$. Depending upon which of the output signals of the photosensors $20_{10}'$ or the photosensors $20_{10}''$ are called upon for the sum formation for the first and second sum signals, respectively, the graduations $3_{10}'$, $3_{10}''$ on both sides of the graduation axis $9_{10}$ are scanned with different weighting. In this way, a measuring value correction which varies in accordance with the desired error correction in the measuring direction X is obtained.

The selection of which of the output signals of the photosensors 20 are combined to form the respective sum signal can be made for example by a computer included in the evaluating unit. For example, this computer can be programmed to store a series of correction values in computer memory which vary according to the desired error correction course along the measuring direction X. In accordance with these stored correction values, the computer can be programmed to select an appropriate number of the output signals of the photosensors 20 to be summed in order to obtain sum signals of the desired amplitude. A position measuring value can then readily be formed from the two sum signals.

Figure 11:
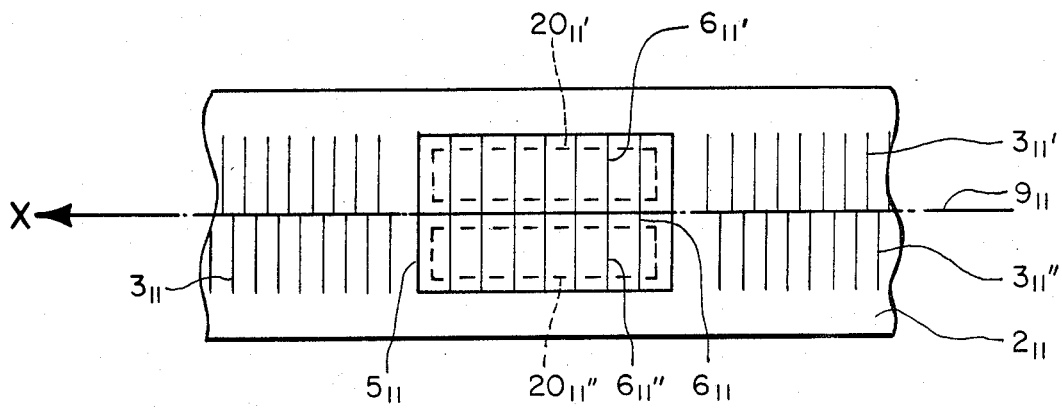
FIG. 11 is a schematic representation of portions of a scale and scanning elements of a length measuring instrument which incorporates an eleventh preferred embodiment of this invention.

FIG. 11 shows a scale $2_{11}$ of a length measuring system which incorporates an eleventh preferred embodiment of this invention. The scale $2_{11}$ defines a graduation $3_{11}$ which is scanned by a scanning plate $5_{11}$ which defines a graduation $6_{11}$. In this example, the graduation $3_{11}$ and the graduation $6_{11}$ both are oriented perpendicularly to the graduation axis $9_{11}$ of the graduation $3_{11}$. In this embodiment, the graduation $3_{11}$ is made up of two graduations $3_{11}'$, $3_{11}''$, each of which is disposed on a respective side of the graduation axis $9_{11}$, and both of which are offset respect to one another by a selected amount in the measuring direction X. The graduation $6_{11}$ is made up of two graduations $6_{11}'$, $6_{11}''$ which are not offset with respect to one another on the respective sides of the graduation axis $9_{11}$. Two photosensors $20_{11}'$, $20_{11}''$ are aligned with the two graduations $6_{11}'$, $6_{11}''$, respectively. The photosensor $20_{11}'$ is not offset in the X direction with respect to the photosensor $20_{11}'$. In this preferred embodiment, the photosensors $20_{11}'$, $20_{11}''$ can be of the type marketed by the Siemens firm as part number SINF 100.

This embodiment includes an evaluating unit (not shown in FIG. 11) which operates to vary the amplitudes of the output signals generated by the photosensors $20_{11}'$, $20_{11}''$. For example, a resistance network can be used for this purpose. In this way, the scanning of the graduations $3_{11}'$, $3_{11}''$ on both sides of the graduation axis $9_{11}$ is performed with different weighting. In this way, a measuring value correction is provided which varies along the measuring direction X in accordance with the desired error correction course.

Figure 12:
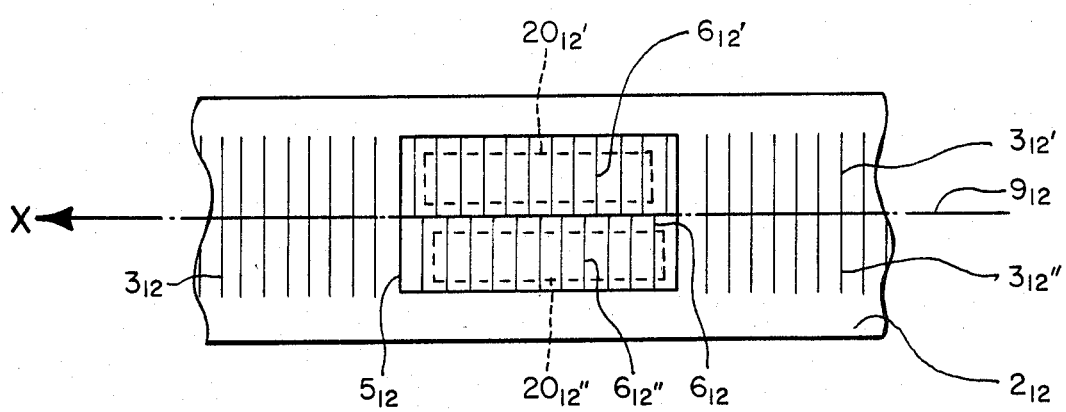
FIG. 12 is a schematic representation of portions of a scale and scanning elements of a length measuring instrument which incorporates a twelfth preferred embodiment of this invention.

FIG. 12 shows a scale $2_{12}$ of a length measuring system which incorporates a twelfth preferred embodiment of this invention. The scale $2_{12}$ defines a graduation $3_{12}$ which is scanned by a scanning plate $5_{12}$ which defines a graduation $6_{12}$. In this embodiment, the graduation $3_{12}$ and the graduation $6_{12}$ are both oriented perpendicularly with respect to the graduation axis $9_{12}$ of the graduation $3_{12}$. Here, the graduation $6_{12}$ is made up of two separate graduations $6_{12}'$, $6_{12}''$, each of which is disposed on respective side of the graduation axis $9_{12}$, and both of which are offset with respect to one another by a selected amount in the measuring direction X. The graduation $3_{12}$ is made up of two graduations $3_{12}'$, $3_{12}''$ which are not offset with respect to one another on the two sides of the graduation axis $9_{12}$. A photosensor $20_{12}'$, $20_{12}''$ is aligned with and associated with each of the graduations $6_{12}'$, $6_{12}''$, respectively. The photosensor $20_{12}'$ is offset with respect to the photosensor $20_{12}''$ in the measuring direction X by the same amount as are the graduations $6_{12}'$, $6_{12}''$.

This embodiment includes an evaluating arrangement (not shown in FIG. 12) which operates to adjust the amplitudes of the output signals of the two photosensors $20_{12}'$, $20_{12}''$ as desired, for example by means of a resistance network. In this way, the two graduations $3_{12}'$, $3_{12}''$ on both sides of the graduations axis $9_{12}$ are scanned with different weighting. In this way, a measuring value correction according to the desired error correction course in the measuring direction X is obtained. In the embodiments of FIGS. 11 and 12, the resistance network can for example be controlled by a computer included in the evaluating unit. Preferably, this computer stores an array of correction values in computer memory which define the desired error correction as a function of the measuring position X. From these stored values, the output signals of the two photosensors can be varied in amplitude as appropriate in order to obtain the desired weighting. Position measuring values are then obtained from these weighted output signals of the photosensors.

The devices of FIGS. 1–12 include embodiments of three approaches for implementing the present invention. The embodiments of FIGS. 1–6 provide various means for physically altering the region of the measuring graduation 3 scanned by the photosensor or photosensors associated with the scanning graduation 6. In each case, the scanning signal $S_G$ generated in response to light modulated by both the measuring graduation 3 and the scanning graduation 6 is a result of the summing or averaging of light which has been modulated by the measuring graduation 3 on both sides of the graduation axis 9.

Figure 13:
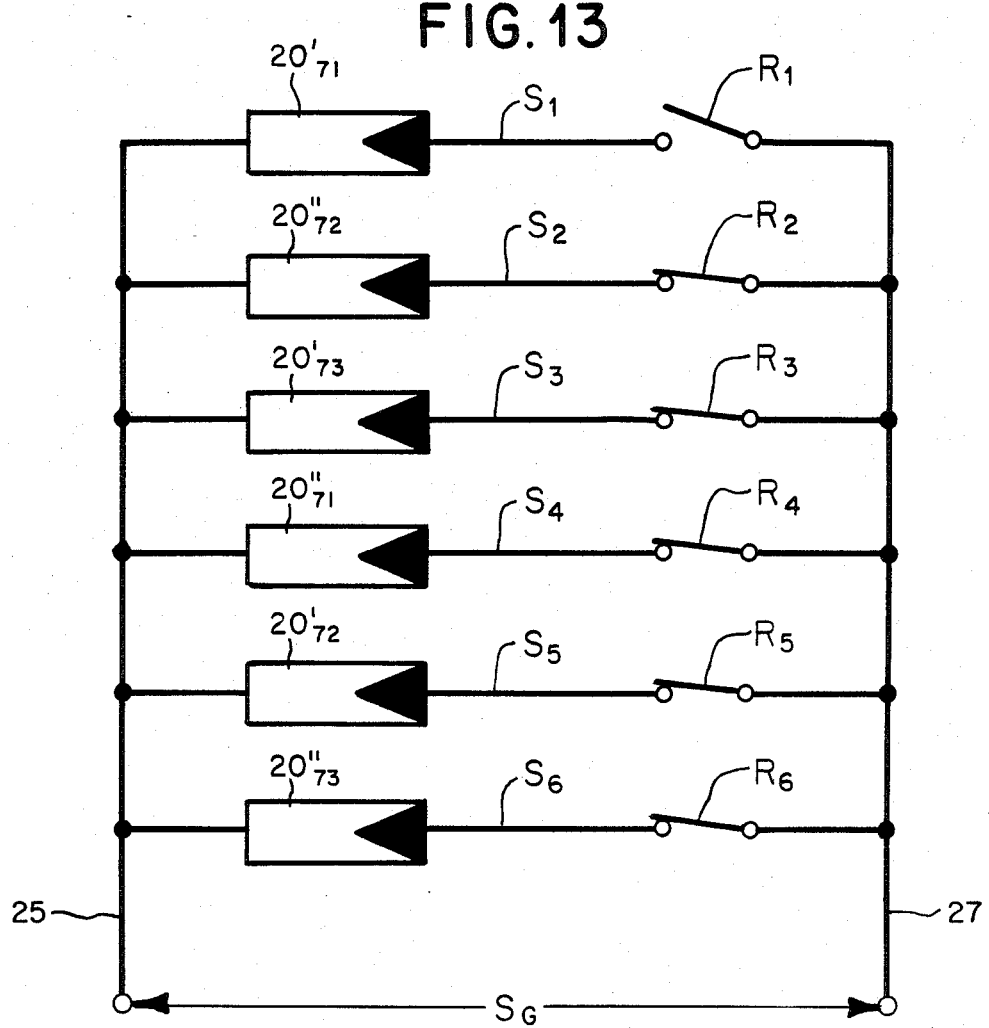
FIG. 13 shows a portion of an evaluating unit suitable for use with the embodiments of FIGS. 7 or 8.

The embodiments of FIGS. 7–10 do not rely on physical shifting of the position of the scanning graduations 6 or photosensors 20 with respect to the measuring graduation 3. Rather, in the embodiments of FIGS. 7–10, multiple photosensors 20 are provided on each side of the graduation axis 9. By forming the scanning signal $S_G$ as a result of the summation of the photosignals generated by selected ones of the photosensors 20, these embodiments can be used to vary the weighting given to the measuring graduation 3 on the two sides of the graduation axis 9. This can perhaps best be seen in conjunction with FIG. 13. FIG. 13 shows a portion of an evaluating unit suitable for use with the embodiments of FIGS. 7 or 8. The same approach can readily be adapted for the embodiments of FIGS. 9 or 10 simply by increasing the number of elements.

As shown in FIG. 13, the six photosensors $20_{71}'$–$20_{73}'$; $20_{71}''$–$20_{73}''$ are connected in parallel between two conductors 25, 27. Each of the photosensors $20_{71}'$–$20_{73}'$; $20_{71}''$–$20_{73}''$ produces a respective photosignal $S_1$–$S_6$. In this embodiment, six analog switches $R_1$–$R_6$ are provided, each of which serves either to pass or to block a respective one of the photosignals $S_1$–$S_6$. A scanning signal $S_G$ is generated between the two conductors 25, 27. Depending upon which of the switches $R_1$–$R_6$ is closed, this scanning signal $S_G$ is formed as a summation signal of selected ones of the photosignals $S_1$–$S_6$. When the switch $R_1$ is open and the switches $R_2$–$R_6$ are closed as shown in FIG. 13, the scanning signal $S_G$ equals the sum defined below:

$$S_G 32 \ S_2 + S_3 + S_4 + S_5 + S_6$$

In effect, the photosignals $S_2$ and $S_3$ have been summed to generate a first sum signal $S_{1-3}$ indicative of the light amplitude modulated by the measuring graduation $3_7'$, and the photosignals $S_4$, $S_5$, and $S_6$ have been summed to generate a second sum signal $S_{4-6}$ indicative of the amplitude of light modulated by the measuring graduation $3_7''$. These two sum signals $S_{1-3}$, $S_{4-6}$ are then in turn summed to produce the scanning signal $S_G$. The positions of the switches $R_1$–$R_6$ can be controlled, for example by a computer included in the evaluating unit, on the basis of correction values stored in the computer memory in accordance with the desired error correction course. The amplitude of the total sum or scanning signal $S_G$ is proportional to the sum of the photosensor areas used for the evaluation. The individual photosensor areas can be equal in size or different in size as desired.

The significance of forming the scanning signal $S_G$ in the manner described above in conjunction with FIG. 13 can best be understood by recognizing that the first sum signal $S_{1-3}$, formed of the sum of selected ones of the photosignals $S_1$, $S_2$, and $S_3$, is a sinusoidal signal which takes the form $S_{1-3} = A\sin(x)$. Similarly, the second sum signal $S_{4-6}$, formed of the sum of selected ones of the three photosignals $S_4$, $S_5$, $S_6$, is also a sinusoidal signal which takes the form $S_{4-6} = B\sin(X+\beta)$. The overall sum signal $S_G$ takes the form $S_G = S_{1-3} + S_{4-6} = E\sin(X+\gamma)$. In the formulas of this paragraph the following symbol definitions have been used:

A = amplitude of signal $S_{1-3}$;
B = amplitude of signal $S_{4-6}$;
E = amplitude of the overall sum signal $S_G$;
$\beta$ = phase displacement or offset between the graduations $3_7'$ and $3_7''$;
$\gamma$ = phase displacement of the overall sum signal $S_G$;

$$E = \sqrt{A^2 + 2AB\cos(\beta) + B^2} \; ;$$

$$\gamma = \arctan \frac{B \cdot \sin(\beta)}{A + B\cos(\beta)} = \text{correction phase.}$$

It can be seen from the foregoing formulas that the overall sum or scanning signal $S_G$ is a sinusoidal signal having a phase displacement $\gamma$ (which is the desired error correction) which is a function of the amplitudes of the two intermediate sum signals $S_{1-3}$ and $S_{4-6}$. By simply selecting which of the photosignals $S_1$, $S_2$, $S_3$ is included in the sum signal $S_{1-3}$ and similarly which of the photosignals $S_4$, $S_5$, $S_6$ is included in the sum signal $S_{4-6}$, the amplitudes A and B of the sum signals $S_{1-3}$, $S_{4-6}$ can be selected in order to vary the correction phase displacement $\gamma$ as desired.

From the foregoing relationships, it should be apparent that it is preferable that the phase displacement $\beta$ not be equal to 180 degrees. This is because when $\beta$ is equal to 180 degrees, the desired error correction $\gamma$ is equal to zero. In the presently preferred embodiment, $\beta$ is equal to 90 degrees. When $\beta$ is set equal to 90 degrees, $\gamma$ is equal to 0 degrees for B=0 and $\gamma$ is equal to 45 degrees for the case where B=A. In this way, by varying B in the range between B=0 and B=A, the correction $\gamma$ can be made to vary between an error correction of 0 and an error correction of 45 degrees (i.e. $\frac{1}{8}$ of the grid constant of the measuring grid $3_7'$, $3_7''$).

The embodiments of FIGS. 11 and 12 represent a third approach to the present invention, which does not rely on the switching in and out of individual photosensors. Rather, in the embodiments of FIGS. 11 and 12, two photosensors are used, one on either side of the graduation axis 9. However, as described above, the photosignals generated by these photosensors 20 are adjusted in amplitude in order to accomplish a variable error correction in a manner analogous to that described above.

Figure 14:
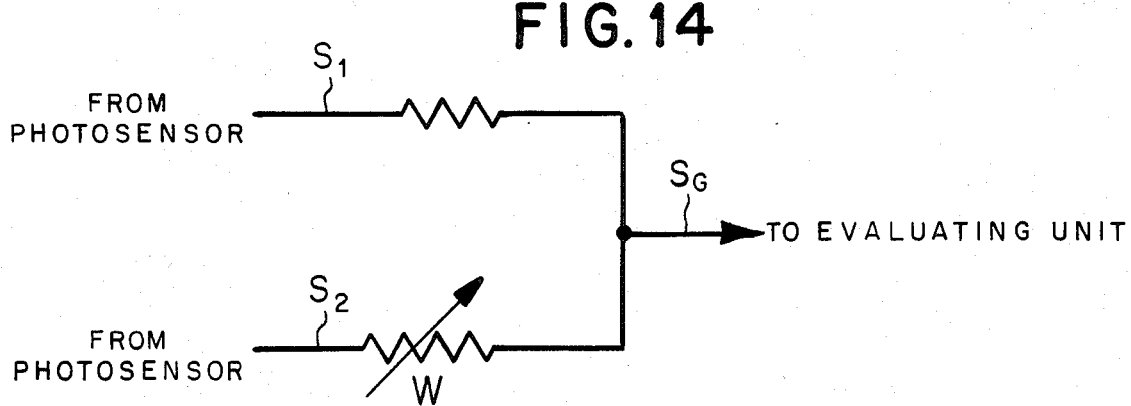
FIG. 14 depicts a circuit for use with the embodiments of FIGS. 11 and 12.

FIG. 14 depicts a circuit suitable for use with the embodiments of FIGS. 11 and 12. As shown in FIG. 14, the photosignal $S_1$ generated by one of the photosensors $20_{11}'$, $20_{12}'$ is summed with the photosignal $S_2$ generated by the other of the two photosensors $20_{11}''$, $20_{12}''$, respectively. The photosignal $S_1$ is attenuated by a fixed resistance and the photosignal $S_2$ is attenuated by a variable resistance W. The summation of the two photosignals $S_1$, $S_2$ is the scanning signal $S_G$ which is applied to an evaluating unit.

Using the terminology of the discussion above in conjunction with FIG. 13, $S_1$ takes the form $S_1 = A\sin(X)$ and $S_2$ takes the form $S_2 = B\sin(X+\beta)$, where $\beta$ is the phase displacement between the graduations $3_{11}'$, $3_{11}''$ or $6_{12}'$, $6_{12}''$. By varying the resistance W in FIG. 14, the amplitude B of signal $S_2$ can be altered as desired. In this way, in a manner analogous to that described above in conjunction with FIG. 13, the scanning signal $S_G$ takes the form $S_G = S_1 + S_2 = E\sin(X+\gamma)$, where $\gamma$ is the phase displacement of the scanning signal $S_G$.

Once the scanning signal $S_G$ has been formed (as for example as shown in FIGS. 13 and 14), the scanning signal $S_G$ is then evaluated in a conventional evaluating unit of the prior art. For example, the evaluating unit designated as EXE 700 manufactured by the firm of Dr. Johannes Heidenhain, Traunreut, West Germany, can be used to evaluate the scanning signal $S_G$ in order to determine the relative position between the scanning unit and the scale.

It should be understood that the graduations $3_7$–$3_{12}$ and the graduations $6_7$–$6_{12}$ can be oriented to run obliquely rather than perpendicularly with respect to the graduation axis $9_7$–$9_{12}$. In embodiments adapted for use with more Moire scanning the graduations $3_7$–$3_{12}$ can enclose an angle with respect to the graduations $6_7$–$6_{12}$. Furthermore, the number of photosensors $20_7$–$20_{10}$ can be made arbitrarily large. The larger the number of photosensors is, the finer the corrections which can be made.

Ordinarily in incremental measuring instruments, four output signals offset from one another by a phase angle of 90 degrees are generated by correspondingly positioned graduation fields on the scanning plate and associated photosensors. These four output signals are used for direction discrimination of the measuring movement and for the elimination of the direct voltage constituents of the output signals of the photosensors. Any of the preferred embodiments described above can be adapted to generate four such output signals by applying the principles illustrated above to each of the four separate scanning fields or each of the four separate sets of photosensors.

Of course, it should be understood that a wide range of changes and modifications to the preferred embodiments described above will be apparent to those skilled in the art. For example, the present invention is not restricted to use with photoelectric measuring systems, but is also readily adapted for use with optical, magnetic, inductive, and capacitive measuring systems. It is therefore intended that the foregoing detailed description be regarded as illustrative rather than limiting, and that it be understood that it is the following claims, including all equivalents, which are intended to define the scope of this invention.

I claim:

1. In a length or angle measuring system comprising a measuring graduation which defines a graduation axis extending along the graduation in a measuring direction, and a scanning unit positioned to scan the graduation, wherein means are provided for coupling the graduation and the scanning unit to two relatively movable objects, the improvement comprising:

means, included in the scanning unit, for scanning a first portion of the graduation on a first side of the graduation axis and a second portion of the graduation on a second side of the graduation axis; and means for varying the weighting given to the first and second portions of the graduation in accordance with a desired error correction pattern.

2. The invention of claim 1 wherein the varying means comprises means for shifting the scanning unit along a path angled with respect to the graduation axis.

3. The invention of claim 1 wherein the varying means comprises a diaphragm positioned to define a scanning field of the scanning unit, and means for shifting the diaphragm along a path angled with respect to the graduation axis.

4. The invention of claim 1 wherein the scanning means comprises means for generating first and second scanning signals in response to the first and second portions of the graduation, and wherein the varying means operates electronically to vary the weights given to the first and second scanning signals.

5. The invention of claim 1 wherein the varying means comprises means for shifting at least a portion of the scanning unit substantially transversely to the graduation axis.

6. The invention of claim 3 wherein the scanning means comprises a scanning graduation and wherein the diaphragm is positioned to partially cover at least one of the measuring graduation and the scanning graduation on at least one side of the graduation axis.

7. The invention of claim 4 wherein the means for generating first and second scanning signals comprises: at least two photosensors positioned to scan the graduation on the first side of the graduation axis to generate at least two first scanning signals; at least two additional photosensors positioned to scan the graduation on the second side of the graduation axis to generate at least two second scanning signals; and wherein the varying means comprises means responsive to a subset of the first scanning signals for generating a first sum signal and means responsive to a subset of the second scanning signals for generating a second sum signal, wherein the subsets of the first and second scanning signals are selected in accordance with the desired error correction pattern.

8. The invention of claim 4 wherein each of the scanning signals is generated by a respective first and second photosensor, and wherein the varying means operates to vary the amplitudes of the first and second scanning signals.

9. The invention of claim 5 wherein the measuring graduation comprises a plurality of grid lines, each oriented in a graduation plane at an angle $\alpha_1$ with respect to the graduation axis; wherein $\alpha_1$ is an angle less than 90°; wherein the scanning unit comprises a scanning element; and wherein the shifting means moves the scanning element of the scanning unit in a plane parallel to the graduation plane, and in a direction transverse to the graduation axis.

10. The invention of claim 1 wherein the measuring graduation comprises a plurality of grid lines, each oriented in a graduation plane and perpendicular to the graduation axis; wherein the scanning unit comprises a scanning element; and wherein the varying means comprises means for shifting at least the scanning element in a plane parallel to the graduation plane at an angle $\alpha_2$ with respect to the graduation axis, wherein $\alpha_2$ is an angle less than 90°.

11. The invention of claim 1 wherein the first portion of the graduation comprises an array of first grid lines; wherein the second portion of the graduation comprises an array of second grid lines; wherein the first and second grid lines are oriented in a graduation plane perpendicular to the graduation axis; wherein the first grid lines are offset with respect to the second grid lines by a selected amount in the measuring direction; wherein the scanning unit comprises a scanning element; and wherein the varying means comprises means for shifting at least the scanning element in a plane parallel to the graduation plane and perpendicular to the graduation axis.

12. The invention of claim 6 wherein the measuring graduation comprises a plurality of grid lines, each oriented at an angle $\alpha_4$ less than 90° with respect to the graduation axis.

13. The invention of claim 6 wherein the first portion of the measuring graduation comprises an array of first grid lines; wherein the second portion of the measuring graduation comprises an array of second grid lines; wherein the first and second grid lines are oriented perpendicular to the graduation axis; and wherein the first grid lines are offset with respect to the second grid lines by a selected amount in the measuring direction.

14. The invention of claim 6 wherein the measuring graduation comprises an array of grid lines oriented perpendicular to graduation axis; wherein the scanning graduation defines at least an array of first scanning lines on a first side of the graduation axis and at least an array of second scanning lines on a second side of the graduation axis; and wherein the first scanning lines are offset with respect to the second scanning lines by a selected amount in the measuring direction.

15. The invention of claim 7 wherein the means for generating first and second scanning signals further comprises a scanning element which defines a single scanning graduation aligned both with the at least two photosensors and the at least two additional photosensors.

16. The invention of claim 7 wherein the means for generating first and second scanning signals further comprises a scanning element which defines a first scanning graduation aligned with the at least two photosensors and a second scanning graduation aligned with the at least two additional photosensors.

17. The invention of claim 8 wherein the means for generating first and second scanning signals further comprises a scanning element which defines a single scanning graduation aligned with the first and second photosensors.

18. The invention of claim 7 wherein the means for generating first and second scanning signals further comprises a scanning element which defines at least one scanning graduation; wherein one of the measuring graduation and the scanning graduation defines an array of first grid lines and an array of second grid lines positioned to one side of the first grid lines; and wherein the first grid lines are offset with respect to the second grid lines by a selected amount in the measuring direction.

19. The invention of claim 8 wherein the means for generating first and second scanning signals further comprises a scanning element which defines at least one scanning graduation; wherein one of the measuring graduation and the scanning graduation defines an array of first grid lines and an array of second grid lines positioned to one side of the first grid lines; and wherein the first grid lines are offset with respect to the second grid lines by a selected amount in the measuring direction.

20. The invention of claim 5 wherein the invention further comprises:
   an error profile positioned alongside the measuring graduation; and
   a transfer element positioned to scan the error profile and coupled to the at least a portion of the scanning unit to position the at least a portion of the scanning unit in response to the contour of the error profile.

21. The invention of claim 6 wherein the invention further comprises:
   an error profile positioned alongside the measuring graduation; and
   a transfer element positioned to scan the error profile and coupled to the diaphragm to position the diaphragm in response to the contour of the error profile.

22. The invention of claim 5 wherein the invention further comprises:
   a plurality of setting elements positioned alongside the scale; and
   a transfer element positioned to scan the setting elements and coupled to the at least a portion of the scanning unit to position the at least a portion of the scanning unit in response to the setting elements.

23. The invention of claim 6 wherein the invention further comprises:
   a plurality of setting elements positioned alongside the scale; and
   a transfer element positioned to scan the setting elements and coupled to the diaphragm to position the diaphragm in response to the setting elements.

24. The invention of claim 21 wherein the transfer element comprises a roller.

* * * * *

UNITED STATES PATENT AND TRADEMARK OFFICE
CERTIFICATE OF CORRECTION

PATENT NO. : 4,527,056
DATED : July 2, 1985
INVENTOR(S) : Horst Burkhardt and Gunther Nelle It is certified that error appears in the above-identified patent and that said Letters Patent is hereby corrected as shown below:

In column 10, line 56, please delete

"$SG^{32} \ S_2 + S_3 + S_4 + S_5 + S_6$"

and substitute therefor;

$--S_G = S_2 + S_3 + S_4 + S_5 + S_6--$

In column 12, lines 7 and 8, please delete "$S_1 = A\text{-}sin(X)$" and substitute therefor $--S_1 = A\sin(X)--$.

Signed and Sealed this

Twenty-second Day of March, 1988

*Attest:*

DONALD J. QUIGG

*Attesting Officer*     *Commissioner of Patents and Trademarks*